United States Patent [19]

Sawdon

[11] Patent Number: 5,647,625

[45] Date of Patent: Jul. 15, 1997

[54] GRIPPER

[75] Inventor: Edwin G. Sawdon, St. Clair, Mich.

[73] Assignee: BTM Corporation, Marysville, Mich.

[21] Appl. No.: 532,362

[22] Filed: Sep. 22, 1995

Related U.S. Application Data

[63] Continuation of Ser. No. 31,630, Mar. 15, 1993, Pat. No. 5,516,173.

[51] Int. Cl.⁶ .................................................. B66C 1/42
[52] U.S. Cl. ........................ 294/86.4; 294/106; 294/902; 269/282
[58] Field of Search ................... 294/86.4, 88, 106, 294/118, 901, 902; 411/393, 399, 402, 403, 426; 269/271, 279–284; 81/479; 901/39

[56] References Cited

U.S. PATENT DOCUMENTS

| | | | |
|---|---|---|---|
| 1,412,961 | 4/1922 | Periolat | 269/282 |
| 3,013,835 | 12/1961 | Blatt | 294/88 |
| 3,184,259 | 5/1965 | Almdale | 294/902 |
| 3,197,894 | 8/1965 | Ratkowski | 411/393 |
| 3,403,901 | 10/1968 | Servadio | 269/284 |
| 3,635,514 | 1/1972 | Blatt | 294/88 |
| 3,655,233 | 4/1972 | Twist | 294/118 |
| 4,109,953 | 8/1978 | Seymour | 294/118 |
| 4,452,556 | 6/1984 | Nelson et al. | 411/403 |
| 4,759,225 | 7/1988 | Reynertson et al. | |
| 4,765,669 | 8/1988 | Meier | 294/106 |
| 5,072,652 | 12/1991 | Blatt | 294/88 |
| 5,125,632 | 6/1992 | Blatt et al. | |
| 5,129,388 | 7/1992 | Vignaud et al. | 411/393 |
| 5,152,568 | 10/1992 | Blatt . | |
| 5,266,057 | 11/1993 | Angel, Jr. et al. | 411/393 |
| 5,299,847 | 4/1994 | Blatt et al. | |

FOREIGN PATENT DOCUMENTS

| | | | |
|---|---|---|---|
| 268961 | 6/1988 | European Pat. Off. | 411/399 |
| 407856 | 1/1991 | European Pat. Off. | 411/399 |
| 1342860 | 10/1987 | U.S.S.R. | 294/902 |

OTHER PUBLICATIONS

Product entitled "Robotics Gripper and Vacuum Heads", Form No. GVH 887 I.S.I. Manufacturing, Inc. (prior to Mar. 1993).

Primary Examiner—Dean Kramer
Attorney, Agent, or Firm—Harness, Dickey & Pierce, P.L.C.

[57] ABSTRACT

There is disclosed a gripper having improved cone and point jaw inserts wherein a single part can be used for both types of insert, thereby doubling the life thereof. Also disclosed is a simple insert retainer which can mount and secure a plurality of inserts with a single fastener, and a one-piece mount for universally mounting a gripper to a support bar using a single fastener.

4 Claims, 2 Drawing Sheets

GRIPPER

This is a continuation of U. S. patent application Ser. No. 08/031,630, filed Mar. 15, 1993 now U.S. Pat. No. 5,516, 173. No. 08/031,630, filed Mar. 15, 1993.

The present invention is related to fluid operated grippers and more particularly to improved gripper jaw inserts of the cone and point type, as well as to an improved gripper mount.

BACKGROUND AND SUMMARY OF THE INVENTION

Grippers are fluid operated (usually pneumatic or hydraulic) devices which are used in industry in large numbers on machining and assembly fixtures. Many different types of grippers are available commercially and they generally have in common the provision of two or more arms which are movable toward and away from one another to grip or release a workpiece, either to hold it in position so that some operation can be performed thereon or to move it to the next operation. Both arms can be movable, or one arm can be movable with the other arm remaining stationary. Commonly, each arm is provided adjacent its free end with a jaw retainer of some sort to attach a jaw insert, such as hard or soft pads, or cone and point inserts for gripping a sheet material workpiece. The present invention is applicable to virtually any type of powered gripper, but resides in the provision of improved cone and point jaw inserts, a retainer therefor and an improved universal mounting device for mounting a gripper to a support bar.

Prior cone and point jaw inserts of which applicant is aware each comprise a number of separate parts, and the cone insert is completely different from the point insert, so that after each is worn it must be discarded. Installation and adjustment of such inserts is also relatively complicated.

It is therefore a primary object of the present invention to avoid the aforesaid disadvantages of prior inserts. It resides in the provision of a simple, relatively inexpensive one-piece insert which replaces both the cone insert and the point insert, as a result of which it can be reused as a new cone insert after it has been fully used (worn) as a point insert, and vice versa, thus doubling the life of the insert. The insert of the present invention is also very light in weight, thus permitting faster cycle times, and is extremely simple to install and adjust. The latter is further facilitated by the provision of a set-up groove on the insert to make it visually easy to install to an initial position.

The insert retainer of the present invention is also very simple in design and provides for the locking of a plurality of inserts to the same retainer utilizing a single fastener, which can be operated by the same tool (a simple allen wrench) which is used to adjust the inserts.

The universal gripper mount of the present invention is advantageous in that it resides in a single part having a single fastener for slidably and rotationally securing a gripper to the mount, as well as slidingly, rotationally and swivelably securing the mount to a support bar.

These and other features of the present invention will become apparent from the following description and the appended claims, taken in conjunction with the accompanying drawings.

DESCRIPTION OF THE PREFERRED EMBODIMENT

Figure 1:
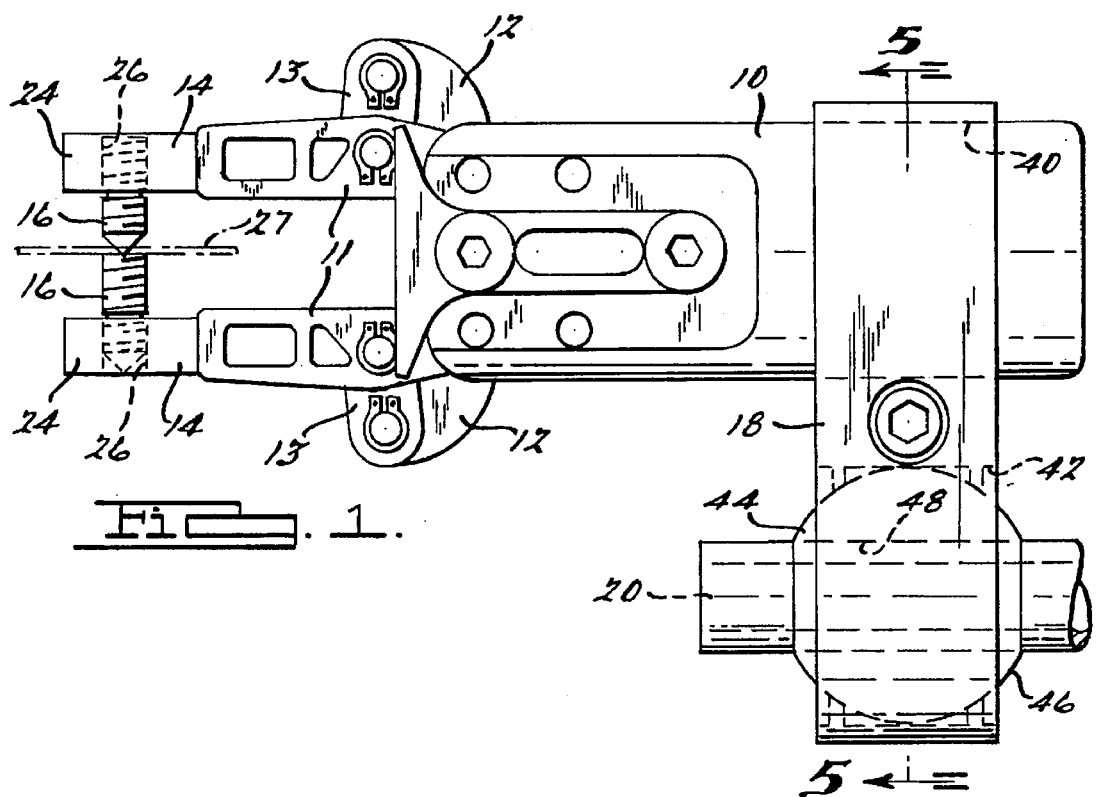
FIG. 1 is a side elevational view of a gripper assembly embodying the principles of the present invention.
Figure 2:
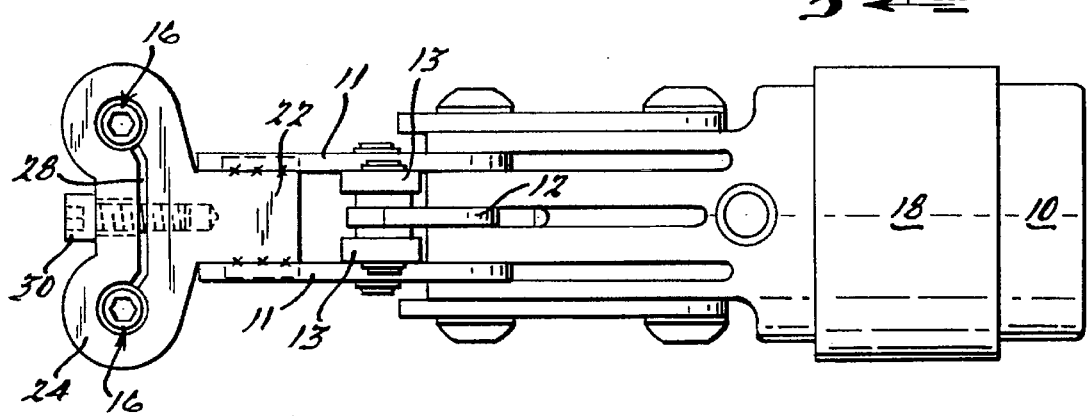
FIG. 2 is a top plan view thereof.

The present invention is applicable to most all types of commercially available powered grippers, the designs of which are well known to those skilled in the art. With reference to the drawings, the gripper assembly embodying the principles of the present invention comprises a conventional gripper 10 having gripping arms 11 which move relatively toward and away from one another in the usual manner by means of a powered reciprocating link 12 and a pivoting link 13, a jaw insert retainer 14 affixed to the free end of each arm 12, and a pair of jaw inserts 16 mounted on each retainer 14, the gripper being universally mounted by means of a mount 18 to a support bar 20 which can be mounted on a stationary or movable part of a fixture (not shown) in the usual manner.

Figure 4:
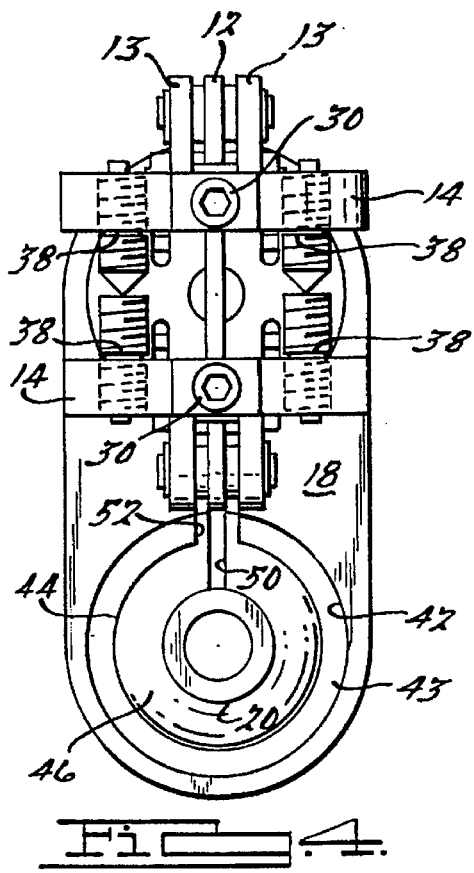
FIG. 4 is a front elevational view of the assembly of FIG. 1.
Figure 5:
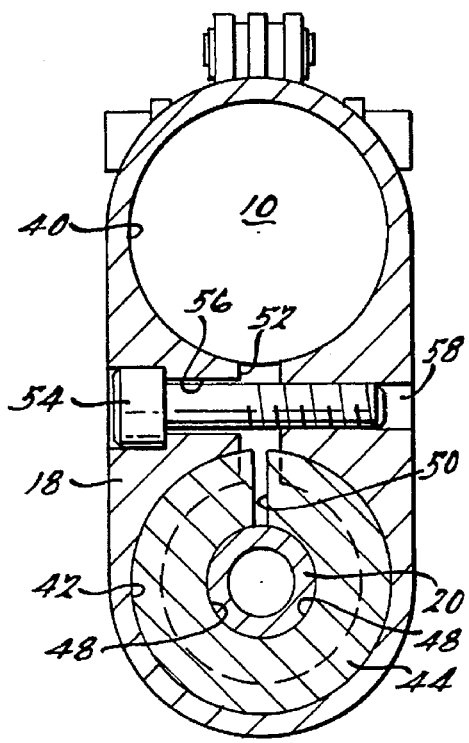
FIG. 5 is a sectional view taken generally along line 5—5 in FIG. 1.
Figure 6:
FIG. 6 is a view similar to FIG. 1, but showing the gripper jaws in an open position.
Figure 6:
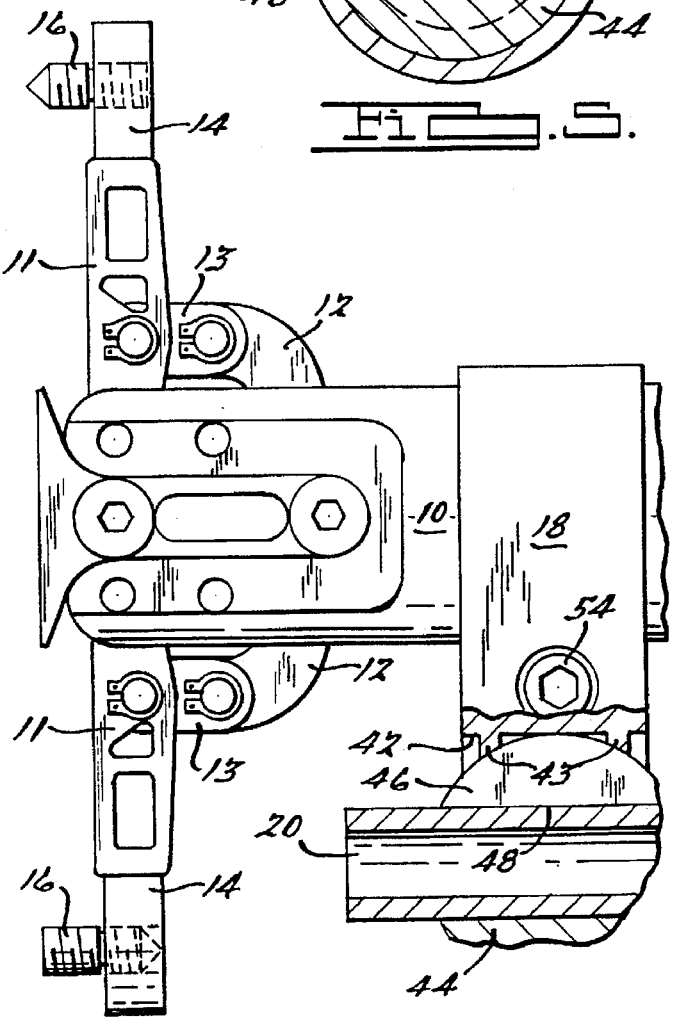

Each of the retainers 14 is the same, comprising an inwardly extending mounting portion 22 affixed to an arm 11 in any suitable manner, such as by welding, and an outwardly projecting body portion 24 having a pair of generally parallel threaded holes 26 in each of which is disposed a jaw insert 16. When the arms, and hence jaws, are in their closed or gripping position, such as shown in FIGS. 1 and 4, all of the inserts 16 are generally parallel to one another and the bottom ends of inserts 16 on the upper retainer 14 engage one surface of the workpiece (indicated in phantom at 27) and the top ends of inserts 16 on the lower retainer 14 engage the opposite surface of the workpiece. The body portion 24 of each retainer has a through-slot 28 intersecting each hole 26 and a fastener, such as a cap screw 30 bridging slot 28. Screw 30 passes through a clearance hole in the portion of the retainer disposed outwardly of slot 28, crosses the slot, and then is threadably disposed in a threaded hole in the main body of the retainer. As can be readily visualized, tightening of screw 30 will cause both inserts 16 to be clamped in place in holes 26, and loosening of screw 30 will release the inserts so they can be rotated in holes 26 for adjustment and/or installation purposes.

Figure 3:
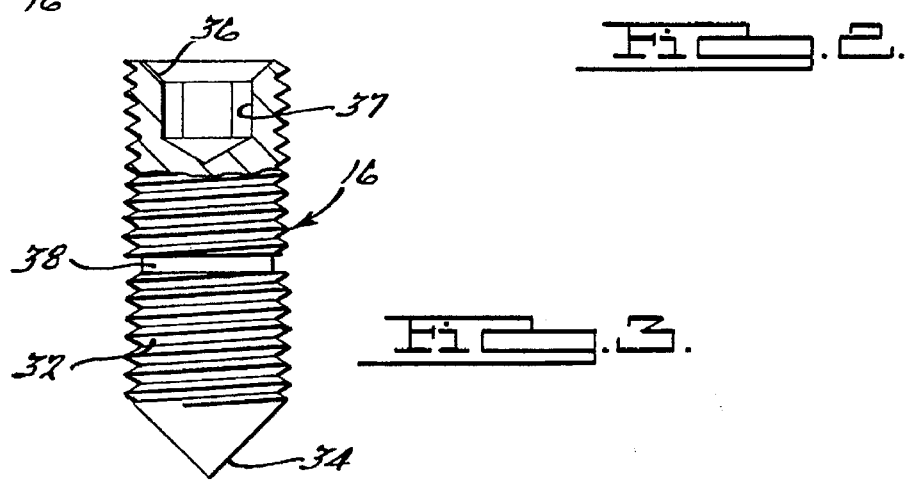
FIG. 3 is an enlarged view of a jaw insert embodying the principles of the present invention.

As best shown in FIG. 3, each insert has a generally circular cylindrical body formed of hardened metal and having external threads 32 matching those of holes 26. At one end the insert has an integral conical projection or point 34 and at the opposite end a concial recess 36 of approximately the same included angle as projection 34. In the bottom of recess 36 is a hex-shaped blind hole 37 adapted to receive an allen wrench to facilitate rotation of insert 16 in hole 26. Screw 30 preferably can be driven by the same size allen wrench so that a single simple tool may be used to install, remove and adjust all of the inserts on a gripper. Another feature of the invention is the provision on each insert of a set-up groove 38 which can be positioned adjacent the surface of the retainer for intial insert positioning, as shown in FIGS. 1 and 4.

In addition to the simplicity of the parts, one of the significant advantages of the present invention is that after all of the points on a given gripper have worn out, all that is necessary is to switch the inserts from the lower retainer to the upper retainer and vice versa. This doubles the life of each insert.

Mount 18 comprises a pair of generally parallel through-openings 40 and 42 the latter having a pair of spaced internal circumferential ribs 43. Gripper 10 is initially rotatively and axially slidably disposed in opening 40. Swivelably disposed in opening 42 is a generally annular swivel member 44 having a spherical outside surface 46, a central through-hole 48 adapted to initially slidingly and rotatively receive support bar 20, and a slot 50 extending between hole 48 and surface 46. Slot 50 permits sufficient compression of member 44 that it can be snapped into position in opening 42 between ribs 43 for permanent assembly to mount 18. A slot 52 extends through mount 18 between openings 40 and 42 and is bridged by a cap screw 54, which passes first through a clearance hole 56 in mount 18, then bridges slot 52, and the extends into and threadably engages a suitable threaded hole 58 in mount 18 on the opposite side of slot 52. The present invention thereby makes it possible to universally mount gripper 10 in any one of an almost unlimited number of positions and then lock it in place by tightening a single fastener, i.e., screw 54. For repositioning of the gripper, screw 54 is the only fastener that has to be loosened.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. In combination, an insert disengagably attachable to a powered gripper, said combination comprising:

(a) said insert including:
      (i) a body;
      (ii) a discontinuity disposed on an outside surface of said body;
      (iii) a recess at a first end of said body;
      (iv) a wrench-receiving non-circular blind hole disposed in a bottom of said recess;

(b) a mount having generally parallel through-openings, said powered gripper being initially rotatably and axially slidably disposed within one of said openings;

(c) a substantially annular swivel member being disposed in another of said through-openings;

(d) a slot extending between said through-openings; and (e) a threaded fastener transversely bridging said slot, said fastener selectively causing said mount to tighten about said powered gripper and said swivel member in order to securely affix said powered gripper and said swivel member within said mount.

2. An insert for use in a powered gripper, said insert comprising:

a body having a conical first end, an opposite second end and an outer surface;

a frusto conical recess being disposed in said second end;

a wrench-receiving non-circular hole disposed in said recess;

a pair of helical threads being disposed on said outer surface and being longitudinally separated from each other by an annular groove disposed below crests of said pair of threads, said groove being longitudinally located substantially equidistant between said ends; and said wrench-receiving hole being internally located within a portion of said body surrounded by one of said threads.

3. The insert as claimed claim 2 wherein said first end has an uninterrupted conical surface ending in a point.

4. The insert as claimed in claim 3 wherein an angle of said conical surface is substantially identical to an angle of said recess.

* * * * *